Sept. 2, 1947.   A. McCRIMMON   2,426,973
RAT TRAP
Filed Sept. 2, 1943   3 Sheets-Sheet 1

Inventor
Alex McCrimmon
By
Attorneys

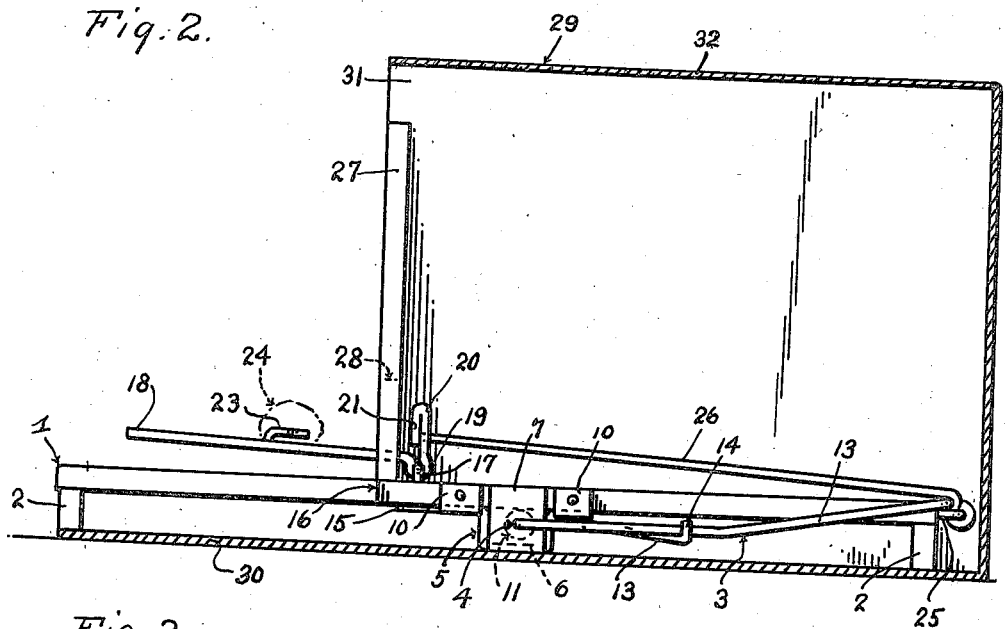
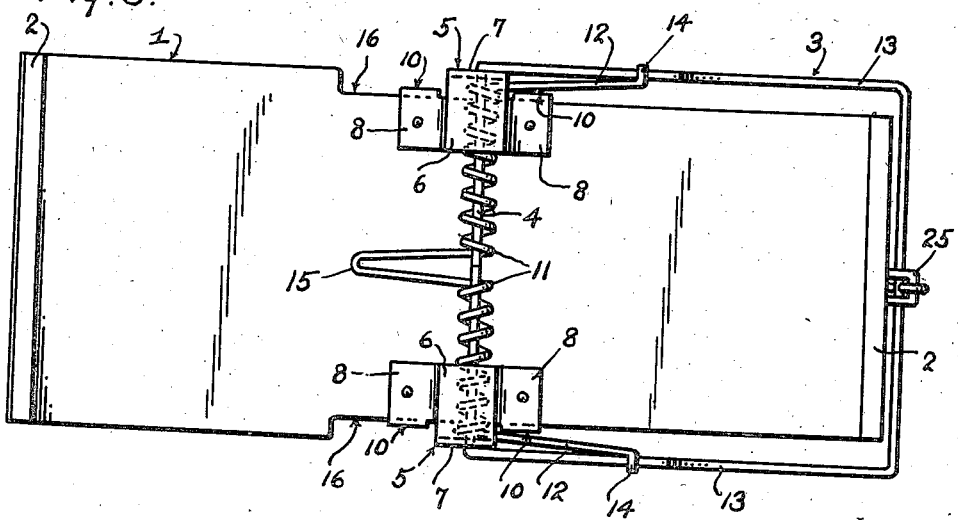

Sept. 2, 1947.　　　　A. McCRIMMON　　　　2,426,973
RAT TRAP
Filed Sept. 2, 1943　　　　3 Sheets-Sheet 3

Inventor
Alex McCrimmon

By Clarence A. O'Brien
and Harvey B. Jacobson
Attorneys

Patented Sept. 2, 1947

2,426,973

UNITED STATES PATENT OFFICE 2,426,973

RAT TRAP

Alex McCrimmon, Wilson, N. C.

Application September 2, 1943, Serial No. 500,968

2 Claims. (Cl. 43—81)

The present invention relates to new and useful improvements in rat traps of the type comprising a base having mounted thereon a spring actuated, pivoted wire jaw, and has for its primary object to provide a novel construction, combination and arrangement whereby the mechanism, with the exception of the trigger, will be substantially concealed from the view of the animal.

Another very important object of the invention is to provide a rat trap of the aforementioned character wherein the pivoted end of the jaw and the actuating spring therefor are located below the base, whereby the striking force and pressure exerted by said jaw will be increased.

Other objects of the invention are to provide a rat trap of the character described which will be comparatively simple in construction, strong, durable, highly efficient and reliable in use, compact, and which may be manufactured at low cost.

All of the foregoing, and still further objects and advantages of the invention will become apparent from a study of the following specification, taken in connection with the accompanying drawing wherein like characters of reference designate corresponding parts throughout the several views, and wherein:

Figure 2 is a view in side elevation of the trap, showing the enclosure in vertical longitudinal section on line 2—2 of Figure 1.

Figure 3 is a bottom plan view of the trap.

Figure 1:
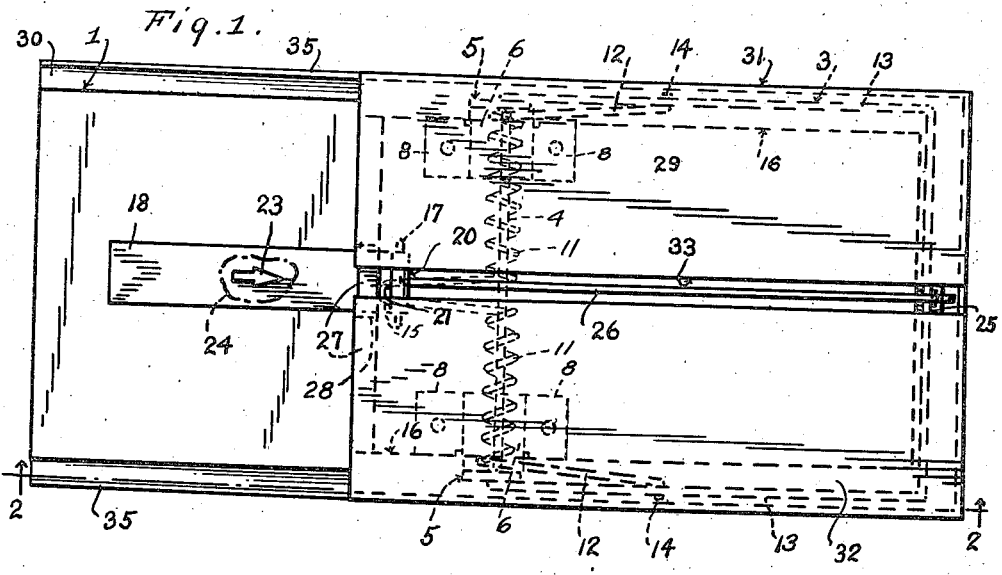
Figure 1 is a top plan view of a rat trap constructed in accordance with the present invention.

Referring now to the drawing in detail, it will be seen that the embodiment of the invention which has been illustrated comprises an elongated base of suitable material, preferably wood, which is designated generally by reference character 1. The base 1, which may be of any desired dimensions, has mounted transversely beneath its end portions supports 2.

A vertically swinging wire jaw 3 is operable on the base 1. The jaw 3 includes a shaft 4 on one end, which shaft extends transversely beneath the base 1 at an intermediate point. The shaft 4 is journaled in brackets 5 which are secured beneath the longitudinal marginal portions of the base 1.

Figure 7:
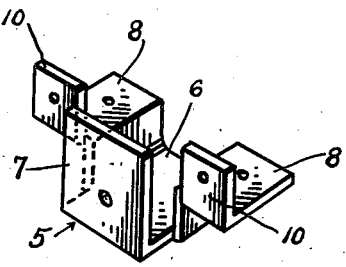
Figure 7 is a detail view in perspective of one of the jaw brackets.
Figure 9:
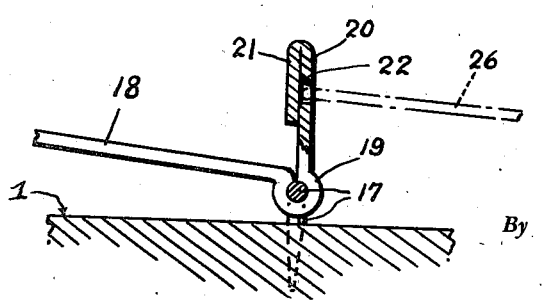
Figure 9 is a view principally in vertical section through the rear portion of the trigger.

As illustrated to advantage in Figure 7 of the drawing, the brackets 5 which have been shown are stamped from a single piece of suitable sheet metal and comprise substantially U-shaped portions 6 having formed integrally with their outer sides upstanding apertured ears 7. The shaft 4 of the jaw 3 passes through the portions 6 of the brackets 5 and is journaled in the apertured ears 7 thereof. The brackets 5 further include apertured flanges 8 on the ends of the portions 6, which flanges are secured beneath the base 1. Rising from the outer edges of the flanges 8 are apertured flanges 10 which are secured to the longitudinal edges of the base 1. A coil spring 11 is provided on the shaft 4 for actuating the jaw 3. The coil spring 11 includes arms 12 on its ends which are operatively connected to the side portions 13 of the jaw 3 by hooks 14. The spring 11 further includes a substantially V-shaped, projecting intermediate portion 15 which is engaged beneath the base 1 for securing said spring against rotation with the shaft 4. The longitudinal marginal portions of the base 1 are cut away or recessed, as at 16, to accommodate the arms 12 of the spring 11. The jaw 3 may be formed of a length of wire having its ends brought together centrally of shaft 4 so that the latter is composed of two sections. Thus, by spreading the side portions 13, the sections of shaft 4 may be separated to permit the brackets 5 and spring 11 to be assembled on said shaft.

Mounted transversely on the base 1 at an intermediate point is a substantially U-shaped loop 17. A trigger 18 is mounted for swinging movement on the loop 17. The trigger 18 includes an eye 19 which is journaled on the loop 17. The trigger 18 further includes an upstanding rear end portion 20 which rises from the eye 19. The free end portion of the member 20 is bent upon itself, as at 21. An aperture 22 is provided in the member 20. Suitable means, as at 23, is provided for securing bait 24 on the trigger 18.

Projecting from the rear end of the base 1 is a staple 25. A wire trip arm 26 is loosely mounted for swinging movement on the staple 25. The free end of the trip arm 26 is engageable in the aperture 22 for securing the jaw 3 in set position and the trigger 18 in raised position.

Rising from the base 1 at a point forwardly of the trigger mounting or loop 17 is a screen 27 in the form of a plate of wood or other suitable material. The screen 27 has formed in its lower portion an opening 28 in which the trigger 18 is operable.

Figure 4:
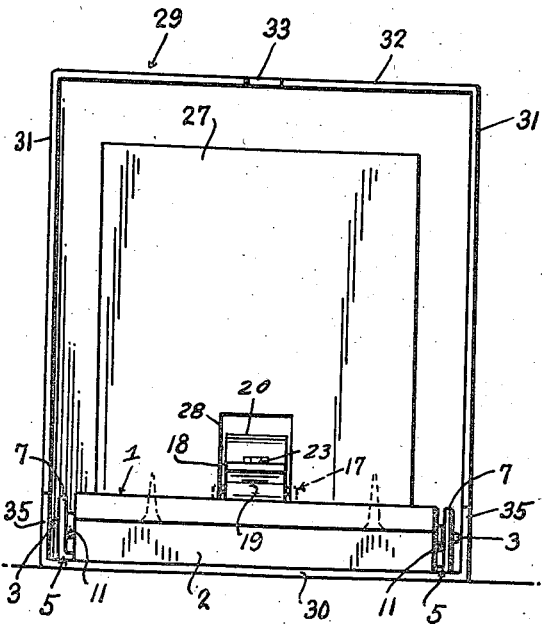
Figure 4 is a front elevational view.
Figure 8:
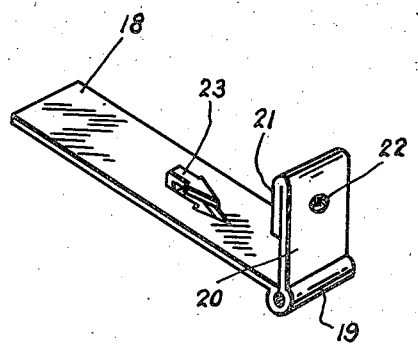
Figure 8 is a detail view in perspective of the trigger.
Figure 5:
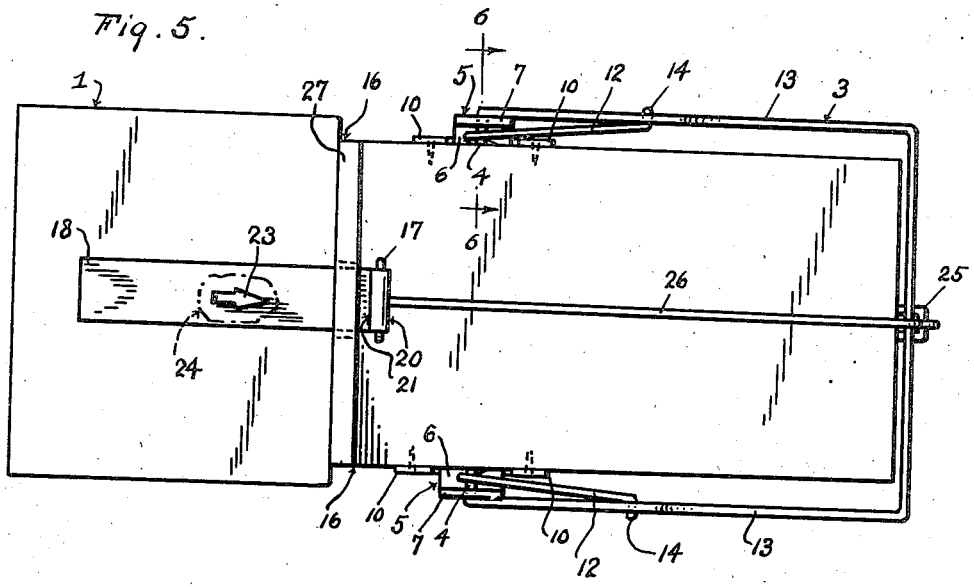
Figure 5 is a top plan view of the trap with the enclosure omitted.
Figure 6:
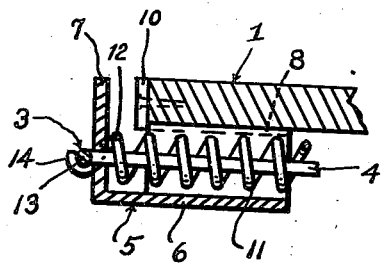
Figure 6 is a fragmentary view in cross-section, taken substantially on the line 6—6 of Figure 5.

A housing 29 substantially encloses the trap from the screen 27 to the rear end of said trap. The housing 29, which is open at its front for the reception of the trap, comprises a bottom 30, in the embodiment shown, on which the supports 2 of the base 1 rest. It will thus be seen that the bottom 30 of the housing 29 projects forwardly beyond the side walls 31 and the top 32 of said housing. The top 32 of the housing 29 has formed therein a longitudinal slot 33 through which the latch 26 may swing. As best seen in Figure 4 of the drawing, the side walls 31 and the top 32 of the housing 29 are spaced from the screen 27 to permit the jaw 3 to swing therebetween.

It is thought that the operation of the trap will be readily apparent from a consideration of the foregoing. Briefly, with the trap removed from the housing 29, the jaw 3 is swung to set position against the tension of the coil spring 11 where it is retained by engaging the trip arm 26 thereon. The trigger 18, with the bait 24 thereon is then swung upwardly to raised position where it is held by engaging the free end of the trip arm 26 in the aperture 22. The trap is then placed in the housing 29. It will thus be seen that a construction and arrangement have been provided whereby substantially all of the mechanism of the trap will be concealed from the view of the animal. Further, the rat cannot approach the bait on the trigger 18 from the wrong position or angle. The forwardly projecting forward end portion of the bottom 30 of the housing 29 includes upstanding side flanges 35 (see Fig. 4) of substantially the height of the base 1. When the trigger 18 is depressed by the rat, the trip arm 26 is released in the usual manner, and, in turn, frees the jaw 3. Of course, the jaw 3 is swung forwardly by the spring 11 for striking and retaining the rat on the forward end portion of the base 1.

It is believed that the many advantages of a rat trap constructed in accordance with the present invention will be readily understood, and although a preferred embodiment of the device is as illustrated and described, it is to be understood that changes in the details of construction may be resorted to which will fall within the scope of the invention as claimed.

What is claimed is:

1. A rat trap comprising a horizontal elongated base having means to support the same in an elevated position, an open spring-actuated jaw having a shaft at one end extending transversely of and beneath the base intermediate the ends of the latter, brackets secured to the opposite side edges of and depending below the base, the shaft being journaled in said brackets, said jaw being of a size and so arranged as to embrace the side and end edges of the base at one end of the latter when in set position, a trigger mounted upon the base, and a trip arm pivoted on the base and engageable with the trigger while overlying the other end of the jaw to releasably secure said jaw in set position substantially entirely below the upper surface of the base, said other end of the jaw being engageable with the upper surface of the base at the other end of the latter when released from set position.

2. A rat trap comprising a horizontal elongated base having means to support the same in an elevated position, an open spring-actuated jaw having a shaft at one end extending transversely of and beneath the base intermediate the ends of the latter, brackets secured to the opposite side edges of and depending below the base, the shaft being journaled in said brackets, said jaw being of a size and so arranged as to embrace the side and end edges of the base at one end of the latter when in set position, a trigger mounted upon the base, and a trip arm pivoted on the base and engageable with the trigger while overlying the other end of the jaw to releasably secure said jaw in set position substantially entirely below the upper surface of the base, said other end of the jaw being engageable with the upper surface of the base at the other end of the latter when released from set position, each of said brackets comprising a U-shaped member having an upstanding ear at the outer side of its intermediate portion in which the shaft is journaled and horizontal and vertical flanges on the upper ends of its end portions respectively secured to the underside of and to the adjacent side edge of the base.

ALEX McCRIMMON.

REFERENCES CITED

The following references are of record in the file of this patent:

UNITED STATES PATENTS

| Number | Name | Date |
|---|---|---|
| 1,464,399 | Allison | Aug. 7, 1923 |
| 571,773 | Leland | Nov. 24, 1896 |
| 1,743,389 | Poncelet | Jan. 14, 1930 |
| 1,429,189 | Chasse | Sept. 12, 1922 |